Figure 4:
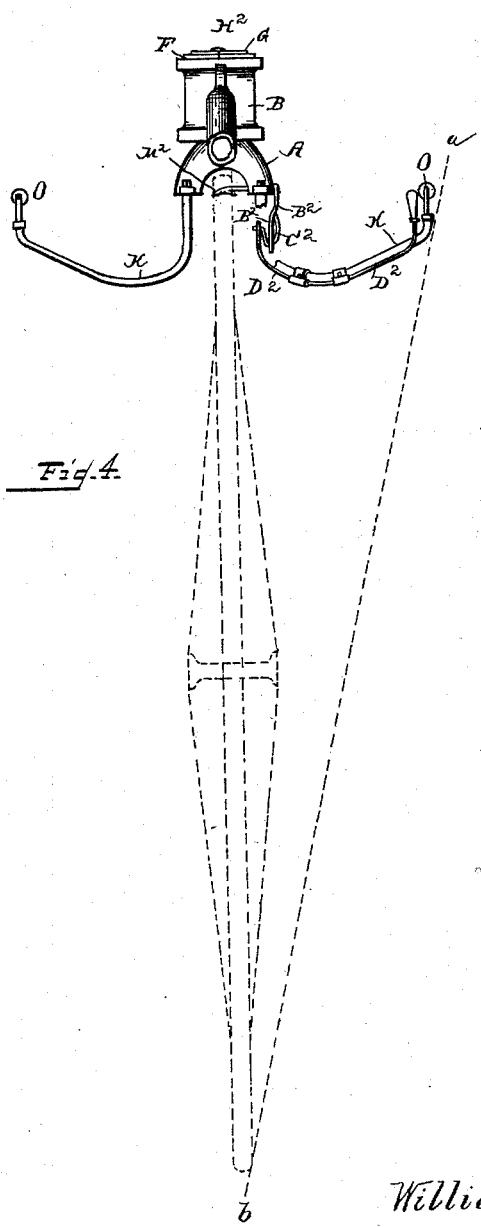

(No Model.)  
2 Sheets—Sheet 1.
W. O. WAKEFIELD.
BICYCLE.
No. 483,273. Patented Sept. 27, 1892.
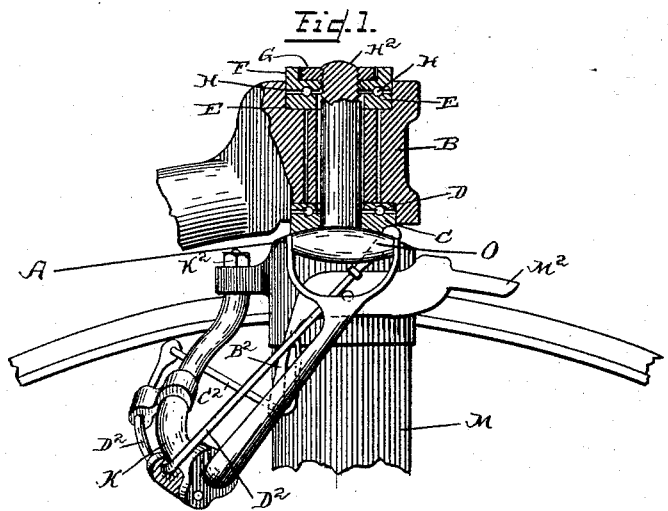
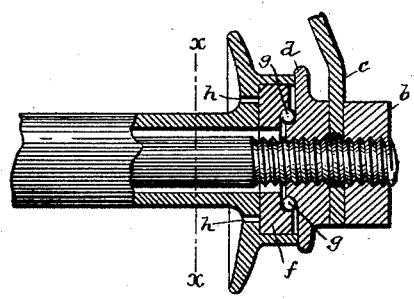
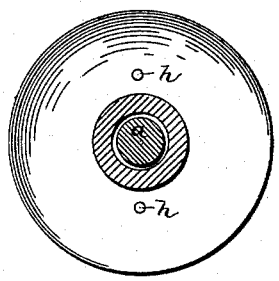
Witnesses
Ira R. Steward
H. H. Capel
Inventor
William O. Wakefield.
By his Attorney
H. C. Townsend (No Model.)

W. O. WAKEFIELD.
BICYCLE.

2 Sheets—Sheet 2.

No. 483,273. Patented Sept. 27, 1892.

Witnesses
Ira R. Steward.
H. H. Capel

Inventor
William O. Wakefield.
By his Attorney
H. C. Townsend

UNITED STATES PATENT OFFICE.

WILLIAM O. WAKEFIELD, OF LYNN, MASSACHUSETTS, ASSIGNOR TO F. W. WEBSTER AND EDWIN W. RICE, JR., OF SAME PLACE.

BICYCLE.

SPECIFICATION forming part of Letters Patent No. 483,273, dated September 27, 1892.

Application filed March 28, 1889. Serial No. 305,152. (No model.)

*To all whom it may concern:*

Be it known that I, WILLIAM O. WAKEFIELD, a citizen of the United States, and a resident of Lynn, in the county of Essex and State of Massachusetts, have invented certain new and useful Improvements in Bicycles, of which the following is a specification.

My invention relates to that form of bicycle which has a large wheel and a small wheel, the larger wheel being that to which the driving and directing or steering power is applied.

My invention relates, first, to a construction of bicycle in which the steering handle or bar, instead of being in front of the rider, extends behind his legs and upward into position to be grasped by the hands.

My invention relates particularly to the manner of attachment of the handle-bar, whereby rigidity and strength are secured. It has heretofore been proposed to employ handle-bars of the same general construction, which permit the rider to leave the machine in a forward or sidewise direction without obstruction. It has heretofore been proposed to attach the handle-bars to the fork and to secure the necessary rigidity by proper appliances; but this construction is unnecessarily complex and does not fully secure the desired end.
My present invention consists, essentially, in fixing the handle-bar directly to the steering-head or to an extension from the same, as will be hereinafter described, such bar being given a proper form to bring it behind the leg of the rider and then upward into position to be grasped.

My invention relates, also, to the construction of the brake and the manner of mounting and operating the same in connection with a machine having a handle-bar of the general form described.

My invention relates, further, to the manner of pivoting the brake-spoon or brake, so as to give increased efficiency.
Further features of improvement relate to the manner of connecting the steering-head and the spine or backbone of the machine, as to secure cheapness of construction, strength, and ease of operation, while at the same time allowing for replacement of parts worn or damaged.

The particular features constituting my invention will be described in connection with the accompanying drawings, and then more particularly specified in the claims.

In the accompanying drawings, Figure 1 is a side elevation and partial vertical section of the upper portion of a machine embodying my invention. Fig. 2 is a partial section of the smaller wheel, showing the construction of the bearings for the same and the manner of connection with the rear fork. Fig. 3 is a vertical section on the line X X, Fig. 2. Fig. 4 is a rear elevation of the machine.

A indicates the steering-head, made, preferably, solid or of great rigidity and, as usual, made in one piece or with the forks M by projections extending downward into the forks in the usual manner.

E E indicate the curved handle-bars, which are attached, as shown, to the steering-head A or to a projection from the same.

For the purpose of forming a solid and direct attachment or connection I prefer to insert the ends of the handle-bars from below upward into the head or an extension upon the same and to fix the handle-bar in its place by means of suitable nuts $K^2$, as indicated. In the drawings I have shown the handle-bar as attached to a lug or projection extending from the steering-head in a backward direction parallel to the wheel, or nearly so, and formed integral with said head. The handle-bars extend downward from such lug or projection, and preferably with a slight rearward inclination, and then are carried upward behind the leg of the rider and finally upward and forward, where they terminate in suitable handles O.

The brake-spoon or brake of the machine is indicated at $M^2$, and is pivoted upon the steering-head or a projection from the same. Heretofore it has been usual to locate the fulcrum of the brake without the periphery of the wheel, in consequence of which the action of the wheel tends to lift the brake off and decrease the friction. To obviate this difficulty, I locate the fulcrum of the brake, as shown, at some point within the circumference of the wheel, the effect of which is that the friction of the wheel when the brake is applied tends to pull the brake down upon the wheel and increase the braking power.

The brake-spoon is operated by means of a brake-lever $D^2$, which is pivoted upon the horizontal portion of the handle-bar and is connected with the downward extension $B^2$ of the brake-spoon by means of a link $C^2$. The brake-lever $D^2$ extends along the back side of the handle-bar and is carried upward on the inside or rear side of the same to a point in convenient proximity to the handle of the steering-bar, so that it may be grasped and lifted or pulled upward by the thumb of the rider while he is grasping the handle-bar. The link $C^2$ is bent upward after passing through the downward extension of the brake-spoon and is carried up in front, so as to act as a spring. The spring, being always under tension, even when the lever $D^2$ is not operated, keeps the parts $C^2 D^2 B^2$ bound together in such manner as to prevent rattling. At the same time the construction is simple and efficient.

In forming the outer end of the handle-bar I prefer to give it a slight inclination inward or to carry it up in such a direction that when the machine falls the handles cannot strike the ground, as shown by the dotted lines A B, Fig. 4.

It will be seen that by carrying the rearward projections from the steering-head back sufficiently far an efficient guard to prevent the clothing of the rider from coming in contact with the wheel is provided.

Extending upward from the steering-head is a spindle $H^2$, which passes through the swivel or sleeve B, forming the head or end of the backbone of the machine. The steering-head and backbone are secured together by means of two nuts G F, applied to the threaded end of the spindle and acting one as a check upon the other, so that upon the rotation of the spindle the nuts rotate with it and do not become loosened. The nut F bears upon friction-balls H, which run in a groove in a bearing-ring E, seated in the upper end of the swivel. The ring or washer E is preferably made of hardened steel, as are also the balls or rollers H and the lower surface of the nut F. At the lower end of the swivel is another bearing-ring or washer D, also preferably made of hardened steel and serving as the bearing for other steel balls H, which rest upon a bearing C, formed of a plate of steel, which rests on top of the steering-head and is secured to the same or to the spindle extending upwardly. The bearings D E are removable, and to assist in their removal for repair holes are provided in the swivel, as shown, so that they may be driven out when they become worn or broken. This construction of the bearings connecting the backbone and the head is exceedingly simple and gives the minimum of friction with accessibility and ease of repair. A similar construction may be adopted in connection with the small wheel of the machine, as shown in Fig. 2, where the hub $e$ of the wheel is provided with recesses at its opposite ends, carrying a removable hardened-steel washer or ring $f$, upon which are seated friction-balls $g$, held in place by bearing-nut $d$. The spindle $a$, upon which the wheel runs, has a screw-thread near its end to receive the nut $d$.

The small fork at the lower end of the backbone has its arm $c$ slipped on over the nut $d$, and a check-nut $b$, applied to the end of the spindle, binds the parts firmly together, $f$ being tightly forced into its seat on the nut of the wheel and caused to rotate therewith.

What I claim as my invention is—

1. In a bicycle, the combination, with the steering-head secured to the fork, of handle-bars the ends of which pass upwardly through a projection from the head and nuts $K^2$, engaging with the screw-threaded ends of said bars, as and for the purpose described.

2. In a bicycle, a brake-spoon engaging with the periphery of the main driving-wheel forward of the steering-head and pivoted to the steering-head or fork at a point below the circumference of the wheel, as and for the purpose described.

3. The combination, with the brake-lever and the brake-spoon, of the connecting-link extended as a spring, as and for the purpose described.

4. The combination, in a bicycle having a handle-bar extending downwardly, outwardly, and upwardly from the steering-head, of a brake-spoon, a brake-lever pivoted on the handle-bar, and a connecting-link between said lever and the brake-spoon, as and for the purpose described.

Signed at Lynn, in the county of Essex and State of Massachusetts, this 5th day of March, A. D. 1889.

WILLIAM O. WAKEFIELD.

Witnesses:
J. W. GIBBONEY,
ELIHU THOMSON.